April 11, 1933. C. A. BORNMANN 1,903,434

COMBINED VIEW FINDER AND CATCH FOR CAMERAS

Filed March 22, 1928

INVENTOR.
CARL A. BORNMANN.
BY
ATTORNEY

Patented Apr. 11, 1933

1,903,434

UNITED STATES PATENT OFFICE

CARL A. BORNMANN, OF BINGHAMTON, NEW YORK, ASSIGNOR TO AGFA ANSCO CORPORATION, OF BINGHAMTON, NEW YORK

COMBINED VIEW FINDER AND CATCH FOR CAMERAS

Application filed March 22, 1928. Serial No. 263,923.

The primary object of my invention is to provide a novel and efficient catch or fastening device for the back of folding cameras combining therewith as a convenient means of operating said catch, a view finder for said camera.

Other objects and advantages in details of construction and operation will be apparent as the description proceeds, reference now being had to the accompanying drawing wherein like reference numerals indicate like parts.

In the drawing:—

Figure 1:
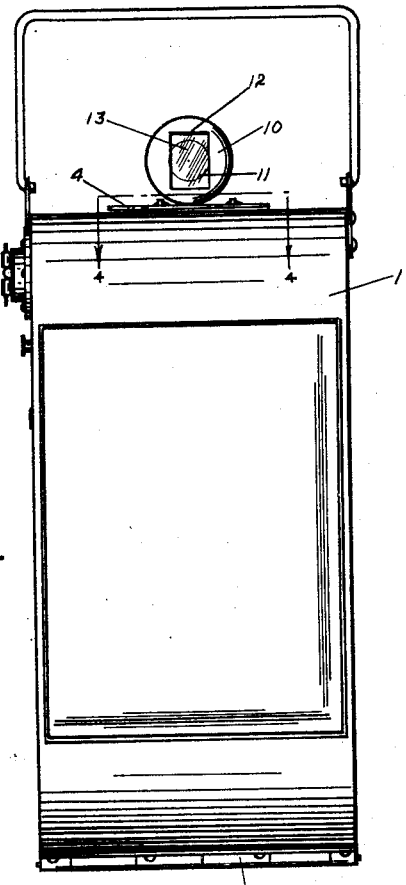
Figure 1 is a front view of a folding camera equipped with my invention.
Figure 2:
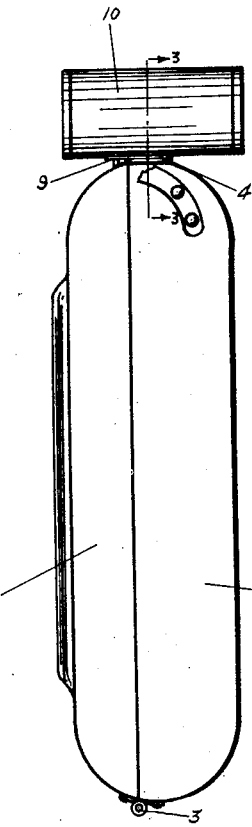
Figure 2 is a side view thereof.
Figure 3:
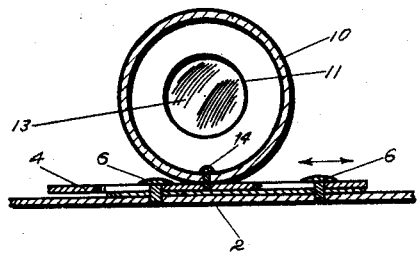
Figure 3 is a detail sectional view taken on the line 3—3 of Figure 2.

The reference numeral 1 refers to a folding camera provided with a back or closure 2 hinged at one end as at 3 to the body of the camera.

Slidably mounted upon the opposite or upper end of the back 2 is a catch plate 4 provided with slots 5 through which extend headed pins 6 secured to the back 2. By this arrangement, the plate 4 may be slid from side to side. The edge of the catch plate 4 overlying the upper end of the camera body 1, is provided with notches 7, which notches after extending inwardly a short distance from the edge of the plate, are turned at right angles to form the slots 8, engageable within which are the upstanding pins 9 carried by the camera body 1.

Figure 4:
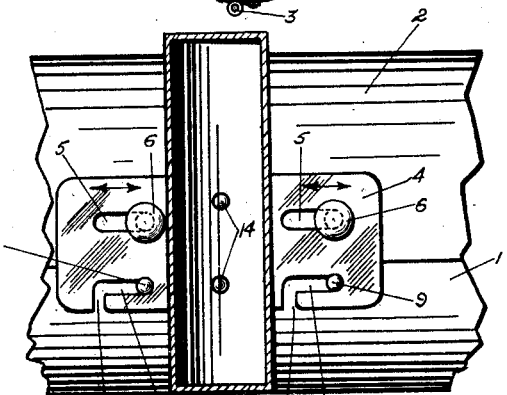
Figure 4 is a detail cross sectional view taken on the line 4—4 of Figure 1.

Obviously with the parts as shown in Figure 4, the back 2 is securely fastened in closed position against the camera body 1, but if it is desired to open the camera by hinging the back downwardly, it is merely necessary to move the plate 4 to the right in Figure 4 to bring the notches 7 opposite the pins 9, whereupon the back 2 may be pivoted rearwardly away from the camera.

I have provided novel means for operating this catch or securing means by utilizing the view finder 10 of the camera, in this instance comprising a cylindrical shell provided with the openings 11 and 12 in its ends, said openings being closed by suitable lenses 13. The body 10 of the finder is suitably secured as by rivets 14 to the catch plate 4, thereby providing a convenient finger hold or manipulating device for such catch plate. When the camera back 2 is closed and the camera used for taking pictures, the finder 10 is of course always in proper position for its regular use.

Of course changes may be made in details of construction and operation without departing from the spirit and scope of my invention. I do not limit myself, therefore, to the exact structure herein shown and described other than by the appended claim.

I claim:—

In combination, a camera comprising a body, a back therefor, a movable locking member on said back cooperating with fixed pins on said body for securing the same thereto in closed position, and a direct view finder on said locking member for operating the same, said finder comprising a tubular housing provided with aligned openings in each end and being in operative position when said back is closed and locked to said body.

CARL A. BORNMANN.